(12) United States Patent
Sugihara

(10) Patent No.: US 10,955,354 B2
(45) Date of Patent: Mar. 23, 2021

(54) CYLINDRICAL BODY SURFACE INSPECTION DEVICE AND CYLINDRICAL BODY SURFACE INSPECTION METHOD

(71) Applicant: Toray Industries, Inc., Tokyo (JP)

(72) Inventor: Hiroki Sugihara, Otsu (JP)

(73) Assignee: TORAY INDUSTRIES, INC.

( * ) Notice: Subject to any disclaimer, the term of this patent is extended or adjusted under 35 U.S.C. 154(b) by 58 days.

(21) Appl. No.: 16/489,390

(22) PCT Filed: Mar. 2, 2018

(86) PCT No.: PCT/JP2018/007917
§ 371 (c)(1),
(2) Date: Aug. 28, 2019

(87) PCT Pub. No.: WO2018/168510
PCT Pub. Date: Sep. 20, 2018

(65) Prior Publication Data
US 2020/0116648 A1    Apr. 16, 2020

(30) Foreign Application Priority Data

Mar. 17, 2017 (JP) .............................. JP2017-052310

(51) Int. Cl.
*G01N 21/88* (2006.01)
*G01B 11/30* (2006.01)
(Continued)

(52) U.S. Cl.
CPC ....... *G01N 21/8806* (2013.01); *G01B 11/306* (2013.01); *G01N 21/952* (2013.01); *G06T 1/0007* (2013.01); *G01N 2021/8835* (2013.01)

(58) Field of Classification Search
CPC .. G01B 17/025; G01B 11/0616; G01B 11/24; G01B 11/303; G01B 17/06; G01B 17/08;
(Continued)

(56) References Cited

U.S. PATENT DOCUMENTS 9,106,857 B1 * 8/2015 Faramarzpour ........ H04N 5/361
2008/0192243 A1    8/2008 Zaman et al.
(Continued)

FOREIGN PATENT DOCUMENTS

JP    2004108828 A    4/2004
JP    2007071562 A    3/2007
(Continued)

OTHER PUBLICATIONS

Extended European Search Report for European Application No. 18 768 694.4, dated Dec. 7, 2020, 5 pages.
(Continued)

*Primary Examiner* — Michael P Stafira
(74) *Attorney, Agent, or Firm* — RatnerPrestia

(57) ABSTRACT

A cylindrical-body surface inspection device includes: a light irradiation unit configured to irradiate the cylindrical body with light; a two-dimensional imaging unit; a scanning-position determination unit configured to determine at a predetermined period, with respect to two-dimensional image data acquired by the two-dimensional imaging unit, a scanning position that is corresponding to a circumferential direction of the cylindrical body; a time-series scanning image generator configured to perform extraction of image data in a second direction perpendicular to the first direction at the scanning position determined by the scanning-position determination unit on a plurality of pieces of the two-dimensional image data acquired by the two-dimensional imaging unit, and generate a time-series scanning image by arranging in chronological order in the first direction each piece of extracted image data of the second direction; and an inspection unit configured to inspect the time-series scanning image to detect a defect.

4 Claims, 11 Drawing Sheets

(51) Int. Cl.
  *G01N 21/952* (2006.01)
  *G06T 1/00* (2006.01)

(58) Field of Classification Search
  CPC ........ G01B 17/02; G01B 11/30; G01B 11/27; G01B 11/2755; G01B 7/105; G01B 11/00; G01B 11/002; G01B 11/272; G01B 11/306; G01B 2210/143; G01B 2210/306; G01B 7/06; G01B 7/10; G01B 7/281; G01J 3/50; G01N 2291/0289; G01N 2291/02854; G01N 21/8806; G01N 2291/0258; G01N 2291/044; G01N 2291/2636; G01N 29/04; G01N 21/8851; G01N 2291/106; G01N 29/07; G01N 29/225; G01N 29/265; G01N 29/28; G01N 21/85; G01N 21/87; G01N 21/88; G01N 21/9027; G01N 21/9036; G01N 21/95; G01N 21/954; G01N 2201/0634; G01N 2223/646; G01N 2291/011; G01N 2291/0231; G01N 2291/051; G01N 2291/2634; G01N 23/04; G01N 27/82; G01N 29/00; G01N 29/043; G01N 33/381; G01N 2021/6439; G01N 2021/6471; G01N 2021/773; G01N 2021/8427; G01N 2021/845; G01N 2021/8822; G01N 2021/8825; G01N 2021/8835; G01N 2021/8848; G01N 2021/8887; G01N 2021/9544; G01N 21/1702; G01N 21/255; G01N 21/47; G01N 21/553; G01N 21/6428; G01N 21/6456; G01N 21/648; G01N 21/783; G01N 21/86; G01N 21/8803; G01N 21/8901; G01N 21/892; G01N 21/9018; G01N 21/909; G01N 21/93; G01N 21/9501; G01N 21/9505; G01N 21/9508; G01N 21/9515; G01N 21/952; G01N 21/956; G01N 21/95607; G01N 21/958; G01N 2201/061; G01N 2201/06113; G01N 2201/062; G01N 2201/0631; G01N 2201/0638; G01N 2201/065; G01N 2201/068; G01N 2201/12; G01N 2223/04; G01N 2223/3306; G01N 2223/3307; G01N 2223/40; G01N 2223/426; G01N 2223/61; G01N 2223/6116; G01N 2223/623; G01N 2223/642; G01N 2223/645; G01N 2223/652; G01N 2223/66; G01N 2291/2694; G01N 23/083; G01N 23/18; G01N 23/2251; G01N 2458/10; G01N 27/3271; G01N 27/44721; G01N 27/825; G01N 27/90; G01N 27/902; G01N 29/14; G01N 29/223; G01N 29/228; G01N 29/2418; G01N 29/2431; G01N 29/2437; G01N 29/2468; G01N 29/2475; G01N 29/2493; G01N 29/326; G01N 29/4463; G01N 29/46; G01N 31/223; G01N 33/005; G01N 33/48721; G01N 33/5308; G01N 33/54306; G01N 33/54366; G01N 33/5438; G01N 35/02; G01N 35/10; G01N 35/1011
  See application file for complete search history.

(56) References Cited

U.S. PATENT DOCUMENTS

2014/0085518 A1* 3/2014 Fox ...................... H04N 5/3743
                                                  348/296
2017/0206647 A1* 7/2017 Rusch ................. A61M 5/3129

FOREIGN PATENT DOCUMENTS

| JP | 2007218629 A | 8/2007 | |
|---|---|---|---|
| JP | 2013195169 A | 9/2013 | |
| WO | WO-0031520 A1 * | 6/2000 | ........... G01N 21/952 |

OTHER PUBLICATIONS

International Search Report and Written Opinion for international Application No. PCT/JP2018/007917 dated Apr. 10, 2018, 4 pages.

* cited by examiner (a)   (b)

POSITION IN SUB-SCANNING DIRECTION
(PIXEL POSITION)

CYLINDRICAL BODY SURFACE INSPECTION DEVICE AND CYLINDRICAL BODY SURFACE INSPECTION METHOD

CROSS REFERENCE TO RELATED APPLICATIONS

This is the U.S. National Phase application of PCT/JP2018/007917, filed Mar. 2, 2018, which claims priority to Japanese Patent Application No. 2017-052310, filed Mar. 17, 2017, the disclosures of these applications being incorporated herein by reference in their entireties for all purposes.

FIELD OF THE INVENTION

The present invention relates to a cylindrical-body surface inspection device and a cylindrical-body surface inspection method that inspect the surface of a cylindrical body used in a process of manufacturing a sheet-like object.

BACKGROUND OF THE INVENTION

In a manufacturing process of a sheet-like object such as a film, a plurality of conveying rolls of a cylindrical body are used for conveyance, stretching, and the like. Due to surface deformation of the roll surface of those conveying rolls, adhesion of foreign matter, or the like, an uneven shape of the roll surface may be transferred onto the surface of the sheet-like object, and defects (periodic defects) may occur continuously at a period of the roll diameter. This periodic defect is discovered, in the manufacturing process or before product shipping, in an inspection by a human or a defect detection device, and that leads to quality assurance or process improvement.

In recent years, however, the quality requirements for a sheet-like object such as a film have become increasingly stringent, and it has been required not only to simply determine the presence of the periodic defects but also to guarantee the intensity of defect to a very small level. Along with this, it has been underway to detect number of defects of the sheet-like object by making the setting of the defect detection device stricter, and to perform period determination on those defects.

Furthermore, as for the conveying roll that is a source of defects, against the adhesion of foreign matter, measures of performing cleaning work of the entire surface of the roll to remove foreign matter are taken for the source. However, against the deformation of the roll surface, because the cleaning work is unable to cope with, it is dealt with by identifying the place of deformation on the roll surface and performing polishing work or film forming work as local unevenness removal work. Thus, in order to cope with the surface deformation, it needs to perform the unevenness removal work after reliably identifying the place of deformation.

In identifying the place of surface deformation, performing a visual inspection by a human is common. However, because of the strictness of quality requirements in recent years, it needs to detect smaller and less varied deformation of the roll surface and, due to the difficulty of work, an automatic inspection device may be used for the detection.

The automatic inspection device can be expected to stably achieve highly accurate and highly sensitive detection as compared with visual detection. However, the permanent installation of automatic inspection devices onto the inspection target rolls may be difficult due to various reasons such as the number of automatic inspection devices being smaller, while there are a plurality of inspection target rolls, than the number of devices that corresponds to the number of the inspection target rolls, for example.

In such a case, the automatic inspection device is temporarily installed in the vicinity of the inspection target roll as needed. However, it needs to set up the automatic inspection device with high accuracy in accordance with a predetermined setting. In particular, with an automatic inspection device employing a line sensor camera generally used in a continuous conveyance process such as a manufacturing process of a sheet-like object, there is a need to adjust the illumination of the automatic inspection device, the mutual distance, angle, and parallelism of the sensor and the inspection target roll, and the like with high accuracy. In addition, because it is difficult to determine whether the surface deformation of the conveying roll is recessed or projecting with a simple regular-reflection optical system, in general, it is desirable to perform inspection under what is called an off-axis regular reflection or catadioptric optical system condition in which the illumination and the optical axis of the camera are somewhat shifted from the regular reflection.

However, because the adjustment of an optical system is very difficult for those who have no knowledge about the optical technology that is needed for the adjustment of the automatic inspection device, in a temporary installed automatic inspection device, it is difficult to stably produce the inspection performance expected of the automatic inspection device.

For the problem that the adjustment of the automatic inspection device is difficult, developed has been a conventional method to cope with the problem by the automatic inspection device using an area sensor. Now, the technique of an inspection method using an area sensor will be described with reference to Patent Literature 1.

In the technology in Patent Literature 1, the image input method of the following procedure obtains an effect as if imaging is performed by a line sensor camera while using an area sensor camera.

(i) A relatively moving measured object surface is irradiated with illumination light from one direction by an illumination unit.

(ii) The reflected light of the irradiation light reflected on the measured object surface is imaged by using an imaging unit of a two-dimensional optical element that is capable of partial reading.

(iii) Based on the reflected light distribution for each pixel row in a sub-scanning direction equivalent to the moving direction of the measured object in the two-dimensional image acquired by imaging by the imaging unit, a pixel at which a bright line that is the brightest in the pixel row in the sub-scanning direction is located is identified.

(iv) A plurality of pixels including a pixel located at a predetermined offset position from the pixel identified in the above-described (iii), and a pixel adjacent to the relevant pixel are selected.

(v) By the sum or the average value of the amount of light of the pixels selected in the above-described (iv), a line image in a main-scanning direction that is orthogonal to the sub-scanning direction is obtained.

(vi) By assuming the line image obtained in the above-described (v) as a main-scanning image, sub-scanning is performed by consecutively imaging multiple times, and a two-dimensional image of the measured object surface is obtained.

In the technology in Patent Literature 1, obtaining the line image by the above-described procedure (iii) to (v) makes it possible to inspect the measured object surface without maintaining the relative position of the measured object surface, the light source, and the imaging system constant.

Patent Literature

Patent Literature 1: Japanese Laid-open Patent Publication No. 2004-108828

SUMMARY OF THE INVENTION

In the method disclosed in Patent Literature 1, however, it has been difficult to detect the unevenness defect, when the adjustment in the position of the automatic inspection device is insufficient.

FIG. 15 is, in the conventional technology, an explanatory diagram illustrating a positional relation between a two-dimensional imaging unit and an illumination unit when a relative position between a measured object surface and a light source and an imaging system is displaced in a parallel direction. FIG. 16 is, in the conventional technology, an explanatory diagram illustrating the positional relation between the two-dimensional imaging unit and the illumination unit when the relative position between the measured object surface and the light source and the imaging system is displaced in a perpendicular direction. FIG. 17A is, in the conventional technology, an explanatory diagram illustrating an example of a scanning position when a change occurs in the bright line width of the measured object surface, and when the bright line width is of an assumed thickness. FIG. 17B is, in the conventional technology, an explanatory diagram illustrating an example of the scanning position when a change occurs in the bright line width of the measured object surface, and when the bright line width is thinner than the assumed thickness. In the technology of Patent Literature 1, the bright line position (bright line center) brightest in the sub-scanning direction on the surface of a measured object 100 is detected for each scanning direction, and the pixels including a pixel located at a certain offset position from the relevant bright line position, and a pixel adjacent to the relevant pixel are selected. Thus, for example, as illustrated in FIG. 15, it is effective when the relative position between the surface of the measured object 100 and an illumination unit 101 and a two-dimensional imaging unit 102 is displaced in the tangent L direction, that is, when the bright line by the reflected light from the surface of the imaged measured object 100 is translated in accordance with the displacement of the relative position. The tangent here is a tangent at the intersection of the optical axis of the imaging system and the measured object surface. As illustrated in FIG. 16, however, when the distance between the surface of the measured object 100 and the illumination unit 101 and the two-dimensional imaging unit 102 changes in the perpendicular N direction as viewed from the surface of the measured object 100, the change in the width of the bright line occurs as illustrated in FIG. 17A and FIG. 17B. For example, in a situation where the bright line becomes thin (see FIG. 17B), it is conceivable that the selected position of the pixel (scanning position) in the above-described procedure (iv) may extend outside the bright line, and in this case, it is not possible to detect the difference in height on the measured object surface and is difficult to detect the unevenness.

In view of the above, an object of the present invention is to provide a cylindrical-body surface inspection method capable of stably and highly accurately inspecting in a cylindrical-body surface defect inspection in which the surface of a cylindrical body is inspected even if the relative position between the surface of the cylindrical body and an inspection device changes, and to provide a cylindrical-body surface inspection device that implements the method thereof.

A cylindrical-body surface inspection device according to the present invention to solve the problem is a cylindrical-body surface inspection device for inspecting at an inspection position a surface of a cylindrical body relatively moving in one direction. The cylindrical-body surface inspection device includes: a light irradiation unit configured to irradiate the cylindrical body with light; a two-dimensional imaging unit arranged at a position to receive reflected light from the surface of the cylindrical body on which light emitted from the light irradiation unit is reflected; a scanning-position determination unit configured to determine at a predetermined period, with respect to two-dimensional image data acquired by the two-dimensional imaging unit, a scanning position that is a scanning position in a first direction of the two-dimensional image data and is corresponding to a circumferential direction of the cylindrical body; a time-series scanning image generator configured to perform extraction of image data in a second direction perpendicular to the first direction at the scanning position determined by the scanning-position determination unit, out of the two-dimensional image data, on a plurality of pieces of the two-dimensional image data acquired by the two-dimensional imaging unit, and generate a time-series scanning image by arranging in chronological order in the first direction each piece of extracted image data of the second direction; and an inspection unit configured to inspect the time-series scanning image to detect a defect. The scanning-position determination unit includes a luminance-profile creation unit configured to calculate an integrated value of luminance of each pixel in the second direction at each position in the first direction from the two-dimensional image data acquired by the two-dimensional imaging unit, and create a luminance profile in which the integrated value is arranged in the first direction, a luminance-peak position calculation unit configured to calculate a peak position of highest luminance from the luminance profile created by the luminance-profile creation unit, a luminance measurement unit configured to measure luminance of the peak position of luminance calculated by the luminance-peak position calculation unit, a luminance-reduction position calculation unit configured to calculate, from the luminance profile created by the luminance-profile creation unit, a position in the first direction corresponding to luminance obtained by multiplying the luminance of the peak position measured by the luminance measurement unit by a predetermined coefficient multiplication value of less than one, and a scanning position holding unit configured to hold a position calculated by the luminance-reduction position calculation unit as the scanning position.

In the cylindrical-body surface inspection device according to the present invention, it is preferable that the light irradiation unit is a linear light source, and that a direction of a central axis of the cylindrical body, a longitudinal direction of the linear light source, and the second direction of the two-dimensional imaging unit are arranged in parallel to one another.

A cylindrical-body surface inspection method according to the present invention to solve the problem is a cylindrical-body surface inspection method for inspecting a surface of a cylindrical body. The cylindrical-body surface inspection method includes a procedure of: irradiating a cylindrical body with light when the cylindrical body is relatively moving in one direction at an inspection position; imaging two-dimensionally the light for which the emitted light was reflected on a surface of the cylindrical body; determining, only at a predetermined period, a scanning position that is a scanning position in a first direction of two-dimensional image data and is corresponding to a circumferential direction of the cylindrical body; generating a time-series scanning image by performing extraction of image data in a second direction perpendicular to the first direction at each determined position in the first direction, out of the two-dimensional image data, on a plurality of pieces of the two-dimensional image data and arranging in chronological order in the first direction each piece of extracted image data of the second direction; and inspecting the time-series scanning image to detect a defect. The scanning position is set, by obtaining a luminance profile by calculating an integrated value of luminance of each pixel in the second direction at each position in the first direction from the two-dimensional image data and arranging the integrated value in the first direction, to a position in the first direction corresponding to luminance obtained by multiplying luminance of a peak position of highest luminance from the luminance profile by a predetermined coefficient multiplication value of less than one.

It is preferable that the cylindrical-body surface inspection method according to the present invention further includes: irradiating a surface of the cylindrical body with linear light; and arranging a direction of a central axis of the cylindrical body, a longitudinal direction of the linear light, and a main-scanning direction in the two-dimensional imaging in parallel to one another.

"A cylindrical body that relatively moves in one direction" in the present invention refers to a cylindrical body that continuously moves in a predetermined one direction at an inspection position. For example, it may be an object that rotates in one direction such as a conveying roll used in the conveyance of a film, or may be a product roll in which a sheet product such as a film is wound.

According to the present invention, a cylindrical-body surface inspection device and a cylindrical-body surface inspection method that are easy to adjust the optical system constituting the automatic inspection device and are capable of inspecting the surface of the cylindrical body that relatively moves in one direction are provided.

DETAILED DESCRIPTION OF EMBODIMENTS OF THE INVENTION

The following describes an exemplary embodiment of the present invention based on the accompanying drawings. The present invention, however, is not limited thereto.

The following describes as an example a case where the best embodiment of the present invention is applied to a roll-surface inspection device for inspecting a conveying roll (hereinafter also simply referred to as a "roll") that conveys a sheet-like object such as a film while referring to the accompanying drawings. Note that the following embodiment illustrates an embodiment of the present invention, and the invention is not limited to the following description. The following embodiment can be modified as long as not departing from the spirit of the present invention.

Figure 1:
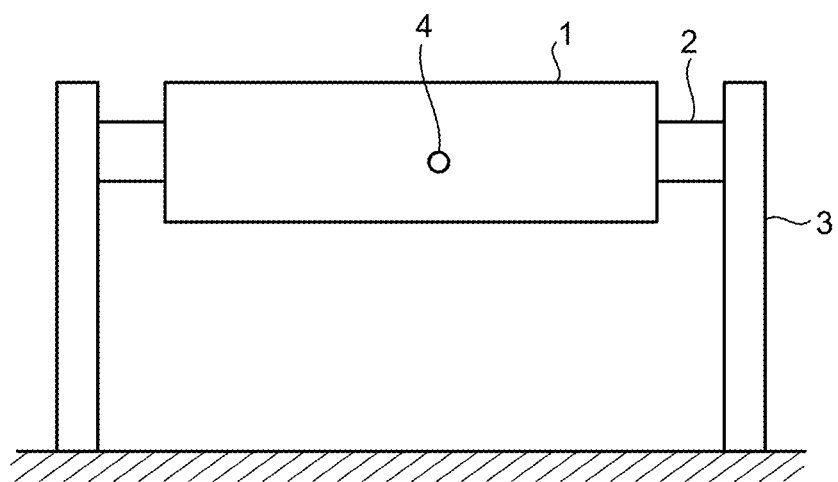
FIG. 1 is an explanatory diagram illustrating a configuration of a conveying roll according to one embodiment of the present invention.

First, conveying roll equipment that conveys a sheet-like object such as a film is illustrated in FIG. 1. FIG. 1 is an explanatory diagram illustrating the configuration of a conveying roll. The reference sign 1 represents a roll body of a cylindrical body, which conveys a sheet-like object such as a film by rotating in one direction while making it contact with the surface. The reference sign 2 represents a core of the roll body 1, and the reference sign 3 represents bearings of the roll. On the surface of the roll body 1, a surface defect 4 having a recessed shape is present. In an automatic inspection, although it is preferable that the roll body 1 be rotated at a constant speed by the power that is transmitted from an electric motor and the like, appropriate imaging timing control may be performed by manually rotating the roll body 1 and by monitoring the amount of rotation of the roll body 1 by using a shaft encoder or a rotary encoder, or the appropriate imaging timing control may be performed by monitoring the rotational speed of the roll body 1 by using a shaft encoder or a rotary encoder while rotating at a constant speed by the external power such as an electric motor.

Figure 2:
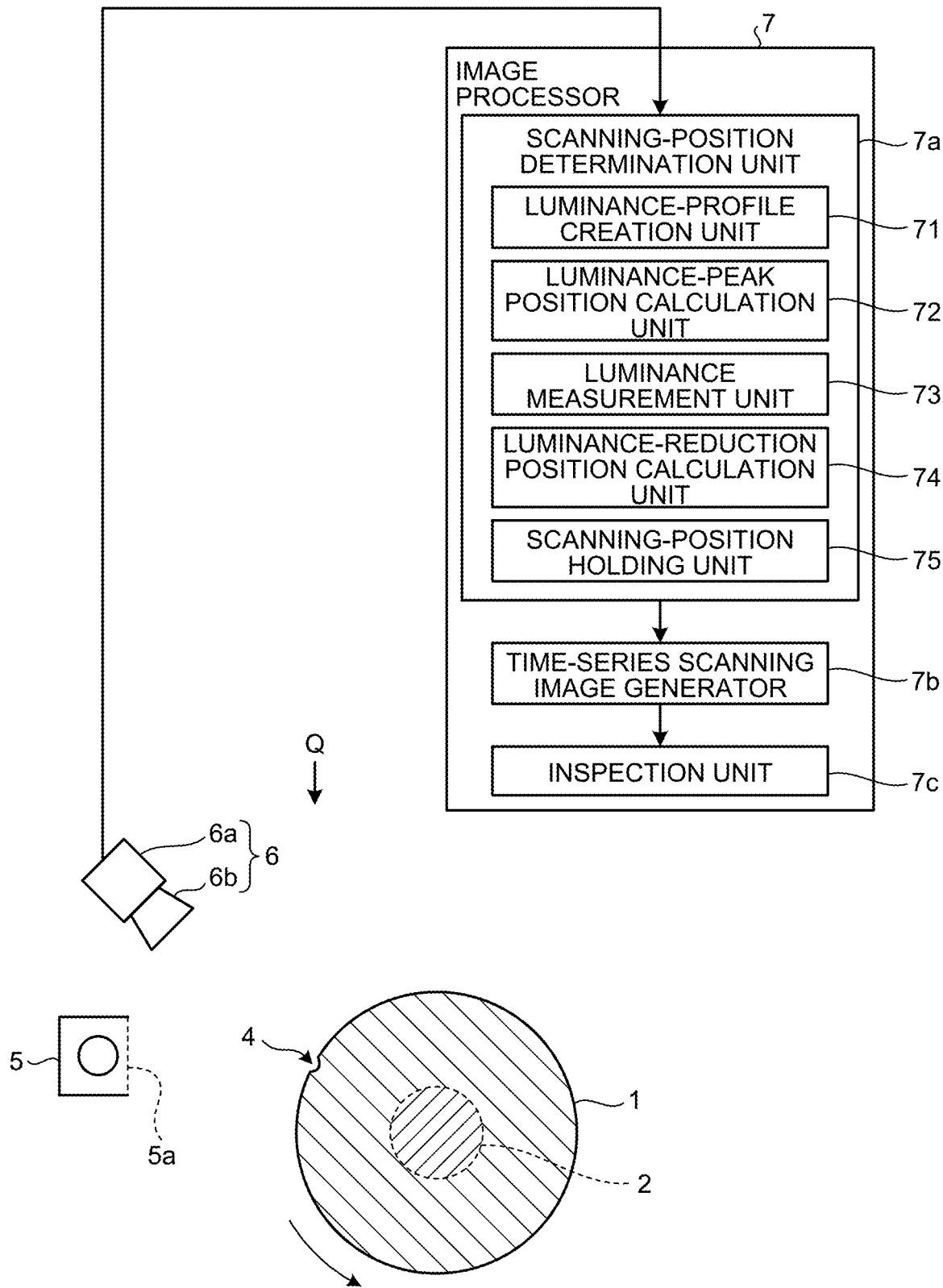
FIG. 2 is an explanatory diagram of an inspection configuration in the embodiment.

Next, an inspection configuration of the roll body 1 is illustrated in FIG. 2. FIG. 2 is a diagram for explaining the configuration of a roll-surface defect inspection device for inspecting the surface of the roll body 1. In FIG. 2, the roll body 1 is indicated at a cross-section for which a plane that is orthogonal to the longitudinal direction of the roll body 1 and passes through the surface defect 4 is a cutting plane. The reference sign 5 represents a light irradiation unit, which irradiates the roll body 1 with light. The light irradiation unit 5 may be any of a fluorescent lamp, a halogen light source, a metal-halide light source, a xenon light source, or an LED light source. Furthermore, it may be a light source having specific wavelength characteristics or a light source having a specific directivity. Preferably, it is a linear light source that has a long light projecting portion in one direction and for which the amount of light emitted from the light projecting portion is substantially uniform. The following will be described with a light source that uses LED illumination and emits substantially uniform light with high directivity in one direction by arranging a plurality of LED light sources in a row (direction orthogonal to the plane of FIG. 2). The longitudinal direction of the LED illumination is substantially parallel to an inspection width direction. The longitudinal direction of this LED illumination may, by considering a plane parallel to the rotation axis of the roll body 1, be rotated within the plane.

The reference sign 6 represents a two-dimensional imaging unit, which is arranged so as to receive the diffused light, and the reflected light from the surface of the roll body 1 on which light emitted from the light irradiation unit 5 is reflected. The two-dimensional imaging unit 6 is made up of an area sensor camera 6a and a lens 6b. The area sensor camera 6a includes a plurality of two-dimensionally configured photoelectric conversion elements. It is preferable that each photoelectric conversion element have high sensitivity, be resistant to noise, and have a small difference in sensitivity among the elements. Furthermore, it is preferable that exposure control can be performed simultaneously on all the photoelectric conversion elements. Here, an area sensor camera of a global shutter type capable of simultaneous exposure control of all photoelectric conversion elements is used, and the horizontal direction of the photoelectric conversion elements, that is, an alignment direction of the main-scanning direction (second direction) is substantially parallel to the longitudinal direction of the light irradiation unit 5 (linear light source).

The two-dimensional imaging unit 6 is arranged in a range where an angle that the light irradiation unit 5 irradiates the roll body 1 with light and an angle that the two-dimensional imaging unit 6 receives the reflected light or the diffused light from the roll body 1 are the same, that is, a range where a regular reflection condition is satisfied.

The two-dimensional imaging unit 6 may use optical auxiliary units such as a polarizing filter and a wavelength selection filter, in order to obtain a light amount distribution or some kind of optical difference depending on the type of defect.

Figure 3:
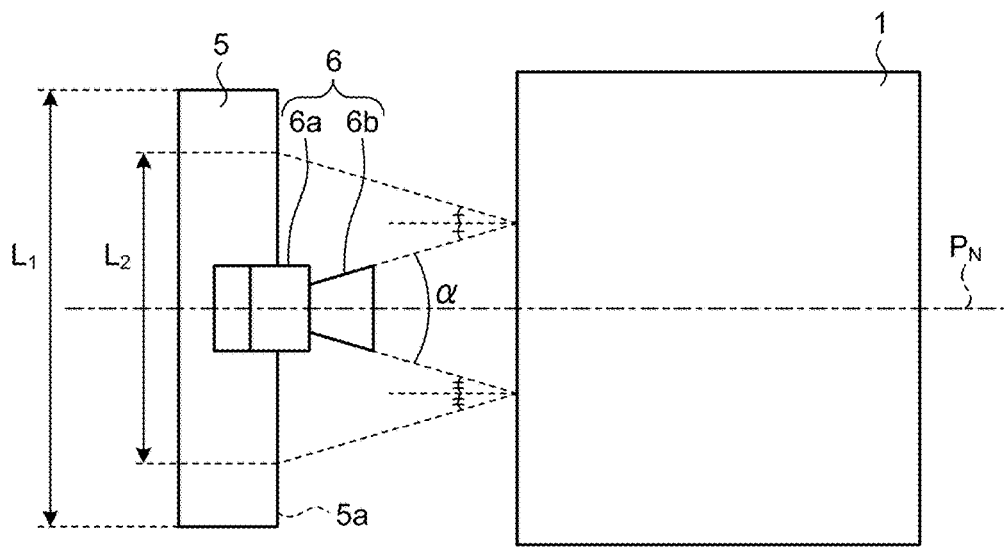
FIG. 3 is an explanatory diagram of a principal portion of the inspection configuration in the embodiment.

FIG. 3 is an explanatory diagram of a principal portion of the inspection configuration in the embodiment. FIG. 3 corresponds to the configuration diagram corresponding to the arrow Q direction in FIG. 2. The plane $P_N$ illustrated in FIG. 3 indicates a plane that is parallel to the optical axis of the two-dimensional imaging unit 6 and is perpendicular to a longitudinal axis of the roll body 1. The shape of a light emitting surface 5a that the light irradiation unit 5 emits is in a rectangular shape. The longitudinal direction of the light emitting surface 5a is parallel to the longitudinal axis of the roll body 1. The light emitting surface 5a is arranged so as to be orthogonal to the regular reflection optical axis with respect to the two-dimensional imaging unit 6 via an inspection surface of the roll body 1. The length in the longitudinal direction of the light emitting surface 5a is set so as to have a sufficiently wider width than a spread angle specified by an angle of view $\alpha$ that the two-dimensional imaging unit 6 images so that it can be assumed as infinity in measurement. Specifically, assuming that the length in the longitudinal direction (illumination length) of the light emitting surface 5a is $L_1$ and the length needed (necessary length) in a light receiving range in the main-scanning direction (longitudinal axis direction of the roll body 1) of the two-dimensional imaging unit 6 is $L_2$, by making $L_1 > L_2$, light irradiation of uniform brightness in the main-scanning direction becomes possible. Because the necessary length and the distance to the surface of the roll body 1 from the light emitting surface 5a are in a proportional relation, in general, the illumination length is secured, by arranging the installation position of the light irradiation unit 5 (distance to the surface of the roll body 1) at a position similar to that of the two-dimensional imaging unit 6.

The reference sign 7 represents an image processor, which is connected to the two-dimensional imaging unit 6. The information on the light that the two-dimensional imaging unit 6 received is photoelectrically converted, and is received by the image processor 7 as two-dimensional image data. The image processor 7 extracts a defect location from the two-dimensional image data, and records and displays the relevant information. As for the defect occurrence position in the conveying direction, it may be determined based on a signal from a conveying-distance measurement encoder (not depicted), or the defect occurrence position may be determined based on the elapsed time from the inspection start. Furthermore, the origin position of the inspection may be defined based on the information from a position detection sensor (not depicted) that is arranged to be able to detect the conveying direction origin of the roll body 1. As for the defect occurrence position in the width direction of the roll body 1, it may be determined based on which element position in the main-scanning direction of the photoelectric conversion elements of the area sensor camera 6a of the two-dimensional imaging unit 6 has detected it. When the width direction of the roll body 1 is larger compared with the inspection width of the two-dimensional imaging unit 6, by installing the two-dimensional imaging unit 6 on a slider (not depicted) movable in a direction substantially parallel to the longitudinal direction of the roll body 1, the defect position in the width direction of the roll body 1 may be managed by a value obtained by adding the amount of move of the slider to the element position in the main-scanning direction of the photoelectric conversion elements of the area sensor camera 6a at which it, has been detected. At this time, the light irradiation unit 5 may be installed on the slider as with the two-dimensional imaging unit 6, or may be arranged independently at the length capable of irradiating the entire area in the longitudinal direction of the roll body 1 at substantially uniform brightness.

The image processor 7 is made up of a scanning-position determination unit 7a that determines a scanning position (for example, defined as a scanning position PA) in the sub-scanning direction (first direction) of the two-dimensional image data that is executed only in a predetermined period, a time-series scanning image generator 7b that extracts image data in the main-scanning direction (second direction) at the scanning position PA determined by the scanning-position determination unit 7a and, by performing the extraction each time the two-dimensional imaging unit 6 acquires the two-dimensional image data, generates a time-series scanning image by arranging in chronological order in the sub-scanning direction the extracted image data of the main-scanning direction, and an inspection unit 7c that inspects the time-series scanning image and detects a defect image. The scanning-position determination unit 7a includes a memory such as a buffer not depicted, and holds the determined scanning position PA in the memory. The sub-scanning direction is equivalent to the moving (rotating) direction (circumferential direction of the roll body 1) of an object to be detected, and the main-scanning direction and the sub-scanning direction are perpendicular to each other.

The scanning-position determination unit 7a includes a luminance-profile creation unit 71 that calculates an integrated value of the luminance of each pixel in the main-scanning direction at each position in the sub-scanning direction from the two-dimensional image data obtained by the two-dimensional imaging unit 6 and that creates a luminance profile in which the integrated values are arranged in the sub-scanning direction, a luminance-peak position calculation unit 72 that calculates a peak position of the highest luminance from the luminance profile created by the luminance-profile creation unit 71, a luminance measurement unit 73 that measures the luminance of the peak position of the luminance calculated by the luminance-peak position calculation unit 72, a luminance-reduction position calculation unit 74 that calculates a position the luminance of which is the luminance obtained by multiplying the luminance of the peak position measured by the luminance measurement unit 73 by a predetermined coefficient multiplication value of less than one from the luminance profile created by the luminance-profile creation unit 71, and a scanning-position holding unit 75 that holds the position calculated by the luminance-reduction position calculation unit 74 as the scanning position PA.

Figure 4:
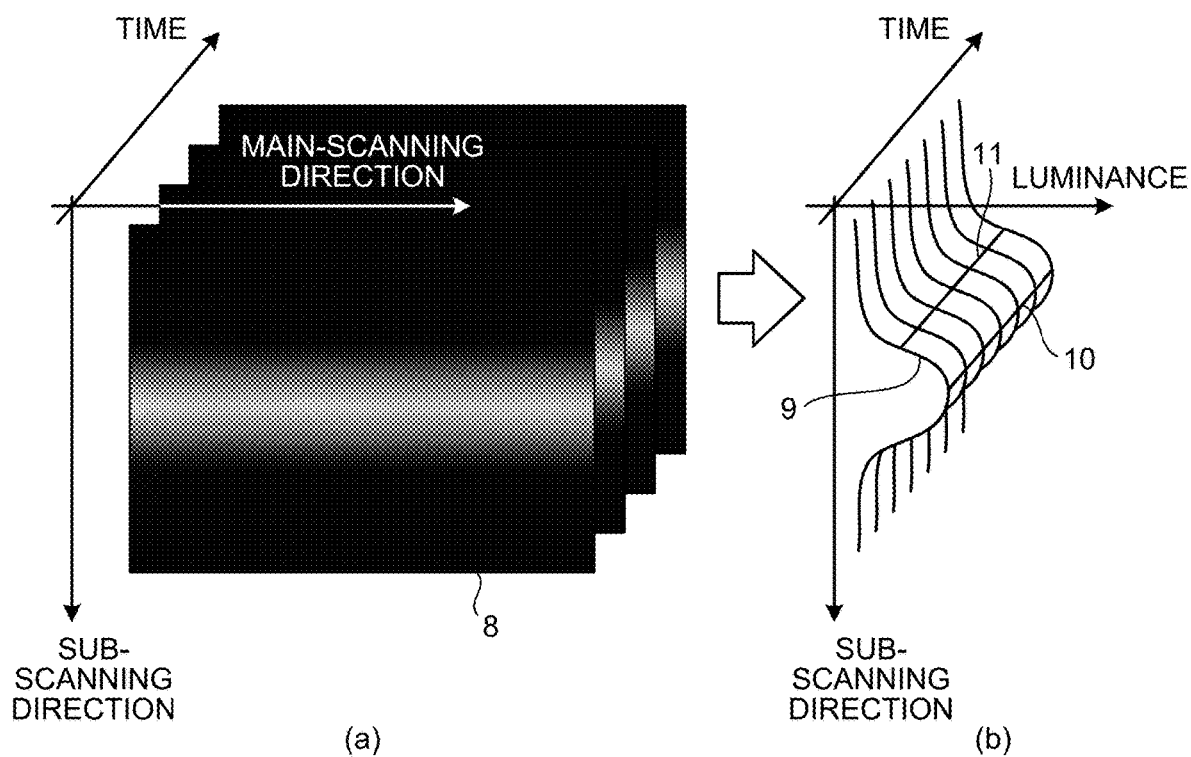
FIG. 4 is an explanatory diagram of a method of acquiring a time-series scanning image in the embodiment.

In order to help understand the method of generating the time-series scanning image, it will be described in detail with reference to FIG. 4. FIG. 4 is an explanatory diagram of a method of acquiring a time-series scanning image. FIG. 4(a) illustrates an image at each position in the sub-scanning direction. FIG. 4(b) is a diagram illustrating the luminance profile in each position for each time.

Two-dimensional image data 8 is image data for which the surface of the roll body 1 relatively moving in one direction was captured by the two-dimensional imaging unit 6 while moving the imaging position little by little, and is image data that imaged an image in which a portion where the reflection image from the light irradiation unit 5 is reflected appears bright and a portion not reflected appears dark (see FIG. 4(a)). Because the imaging is performed by the two-dimensional imaging unit 6 in a state of being focused on the surface of the roll body 1, an edge portion in the reflection image that is a mirror image of the light irradiation unit 5 by the roll body 1 is in an unclear state due to defocusing. However, it becomes bright as it approaches to the center of the reflection image, and becomes dark as it gets away from the edge portion of the reflection image. Thus, the brightness indicates the distribution of the reflection intensity (luminance) of the light from the light irradiation unit at the imaging site. Furthermore, because the light irradiation unit 5 includes a light projection portion that is long in one direction and has substantially uniform brightness, the unclear region of the edge portion is limited to the sub-scanning direction. Thus, the two-dimensional image data 8 is captured as a linear bright line having unevenness in brightness in the sub-scanning direction and extending in the main-scanning direction.

A luminance profile 9 is an abstraction to easily understand this, and illustrates a change in the luminance value of the sub-scanning direction as a profile waveform (see FIG. 4(b)). A luminance peak position 10 of the luminance profile 9 corresponds to the brightest sub-scanning position of the two-dimensional image data 8, and this position corresponds to the imaging position of the regular reflection condition, that is, a condition in which a light incident angle formed by the light irradiation unit 5 and the roll body 1 and the light receiving angle formed by the two-dimensional imaging unit 6 and the roll body 1 are the same. A position 11 corresponds to a position on the luminance profile 9 for which the luminance is obtained by multiplying the luminance of the peak position 10 of the luminance profile 9 by a predetermined coefficient multiplication value of less than one. Thus, because distortion occurs in the reflection image when the surface deformation of unevenness occurs in the roll body 1, the uneven deformation region (for example, the surface defect 4 in FIG. 2) that passed the position 11 in the two-dimensional image data 8 changes in luminance into either bright or dark.

Figure 5:
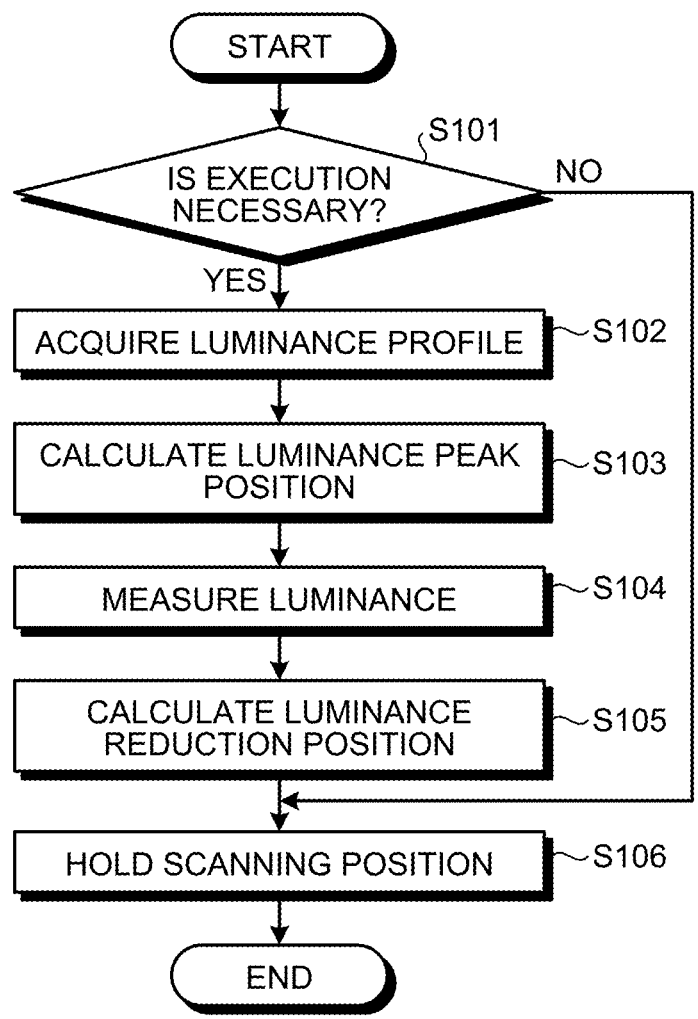
FIG. 5 is an explanatory diagram of a determination flow of a scanning position in the embodiment.

Next, details of the various units in the image processor 7 will be described. The scanning-position determination unit 7a determines, based on the two-dimensional image data received from the two-dimensional imaging unit 6, the scanning position PA, that is, the inspection position in the vertical direction of the two-dimensional data. The flow in which the scanning-position determination unit 7a determines the scanning position PA will be described with reference to FIG. 5. FIG. 5 is an explanatory diagram of a determination flow of the scanning position PA in the present invention.

Step S101 is a step of starting the determination flow of the scanning position PA and is a step of determining whether to execute the subsequent flow. The image processor 7 proceeds to Step S102, when determined to execute the determination flow of the scanning position (Yes at Step S101). The image processor 7 determines to execute the determination flow, when an execution instruction is input from a user via an input unit not depicted, for example. Meanwhile, when determined not to execute the determination flow of the scanning position PA (No at Step S101), the image processor 7 proceeds to Step S106. Whether to execute it is determined in accordance with a predetermined period and, for example, it may be executed only at the timing of inspection start, may be executed each time a fixed distance or a fixed time is inspected, or may be executed at a timing of acquiring the two-dimensional image data received from the two-dimensional imaging unit 6 each time.

Step S102 is a step in which the luminance-profile creation unit 71 acquires a luminance profile in the sub-scanning direction from the two-dimensional image data. The acquisition of the luminance profile may use pixel information on all pieces of the two-dimensional image data in the main-scanning direction, or may use only a predetermined part of the area in the main-scanning direction. The profile value at each position of the sub-scanning direction may use any of an integrated value of the luminance value of each pixel in the main-scanning direction, an average value of the luminance value of each pixel in the main-scanning direction, a median value obtainable from the luminance value of all the pixels to be calculated in the main-scanning direction, a mode value obtainable from a histogram created from the luminance value of all the pixels to be calculated in the main-scanning direction, or an average value obtainable by model fitting by a Gauss function from the assumption that the variation in luminance is distributed like a Gaussian distribution.

Step S103 is a step in which the luminance-peak position calculation unit 72 calculates a luminance peak position from the luminance profile. The luminance peak position may be defined as a position in the sub-scanning direction having a maximum value of the luminance profile, or the peak position may be obtained by model fitting from a reflection-image model function defined from the distance between the area shape of the light irradiation unit 5 and the roll body 1 and from the distance between the two-dimensional imaging unit 6 and the roll body 1.

Step S104 is a step in which the luminance measurement unit 73 performs luminance measurement of the luminance peak value. The luminance peak value may use a profile value of the luminance peak position of the luminance profile, or may use a model profile value of the peak position obtained by model fitting from a reflection-image model function defined from the distance between the light emitting surface (for example, the light emitting surface 5a illustrated in FIG. 2) of the light irradiation unit 5 and the roll body 1 and from the distance between the two-dimensional imaging unit 6 (light receiving surface of the element) and the roll body 1.

Step S105 is a step in which the luminance-reduction position calculation unit 74 calculates a luminance reduction position. The position corresponding to the luminance of the calculated value obtained by multiplying the luminance of the peak position measured in the flow up to the above-described step by a predetermined luminance reduction coefficient of less than one may be defined as the luminance reduction position. Alternatively, the position corresponding to the luminance of a calculated value obtained by multiplying, by a predetermined luminance reduction coefficient of less than one, the luminance value of the luminance peak position that is obtainable from a luminance-profile model function obtained by model fitting from the reflection-image model function defined from the distance between the light emitting surface of the light irradiation unit 5 and the roll body 1 and from the distance between the two-dimensional imaging unit 6 (light receiving surface of the element) and the roll body 1 may be defined as the luminance reduction position.

Furthermore, because the luminance reduction positions are present at two points above and below in the sub-scanning direction across the peak position measured in the flow up to the above-described step, either one of them may be adopted as the luminance reduction position, or by obtaining the respective distances of the luminance reduction position in the negative direction and the luminance reduction position in the positive direction from the peak position and calculating an average value of the distances, the position that is away from the peak position in one direction of either the negative direction or the positive direction by the average value of the distances may be adopted as the luminance reduction position. It is preferable that the calculation direction of the luminance reduction position be limited to one direction of either the negative direction or the positive direction with respect to the peak position at all times.

Step S106 is a step in which the scanning-position holding unit 75 holds the scanning position PA. As the sub-scanning position PA, the luminance reduction position calculated at Step S105 is held, but when the determination flow of the scanning position PA was not executed, the luminance reduction position that was last executed is kept holding as the scanning position PA.

Figure 6A:
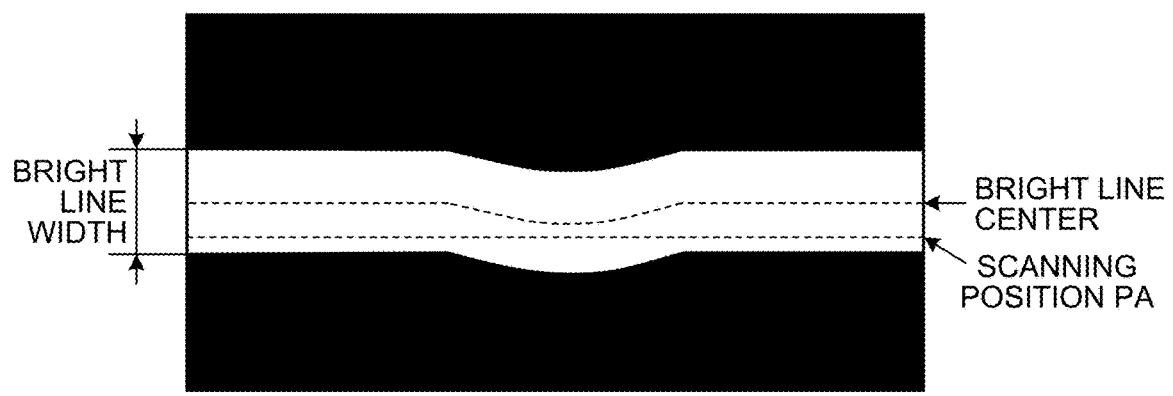
FIG. 6A is, in the embodiment, an explanatory diagram illustrating an example of the scanning position when a change has occurred in a bright line width of a measured object surface.
Figure 6B:
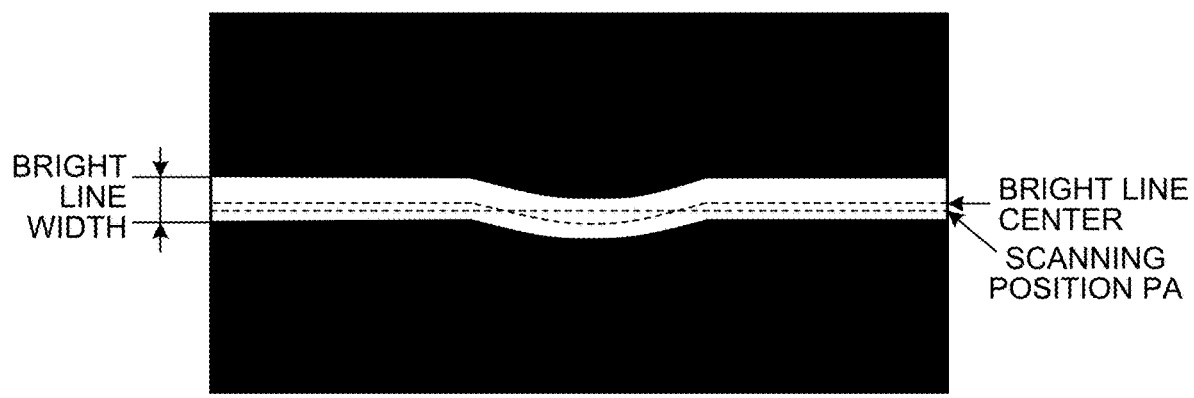
FIG. 6B is, in the embodiment, an explanatory diagram illustrating an example of the scanning position when a change has occurred in the bright line width of the measured object surface.
Figure 17A:
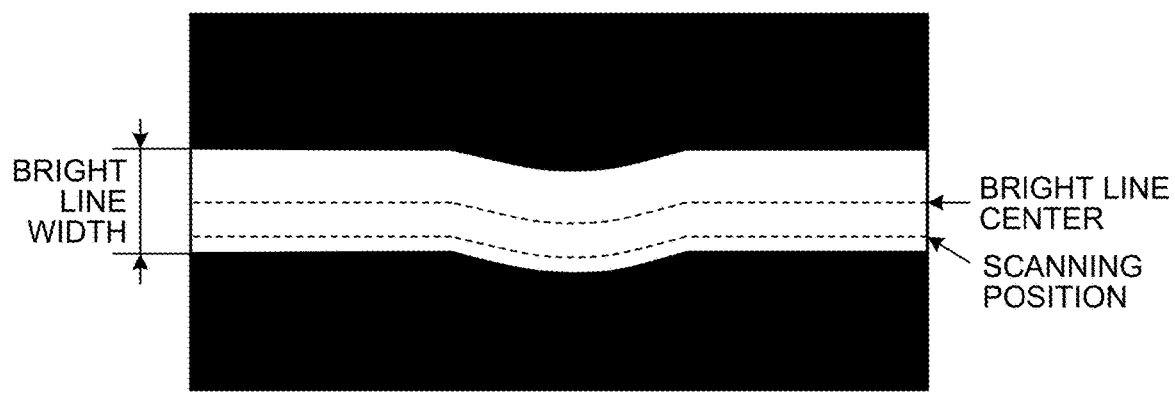
FIG. 17A is, in the conventional technology, an explanatory diagram illustrating an example of a scanning position when a change occurs in the bright line width of the measured object surface.
Figure 17B:
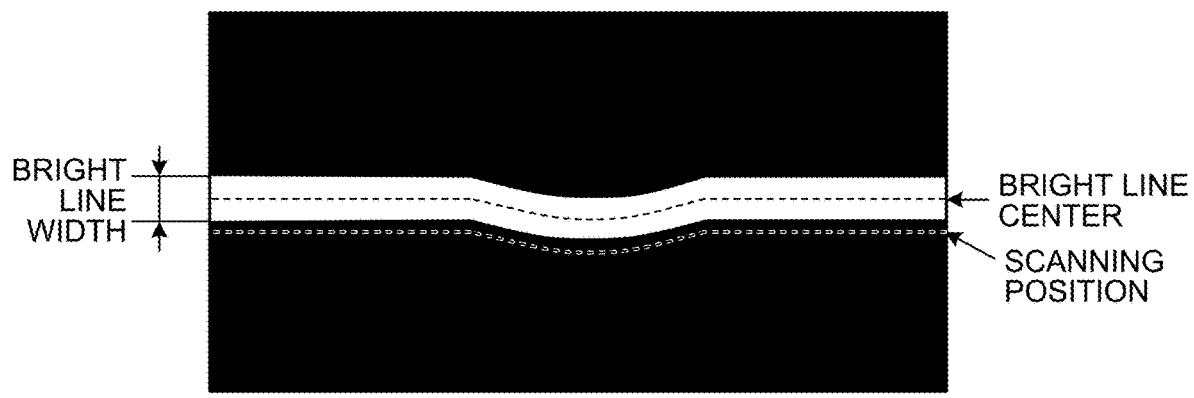
FIG. 17B is, in the conventional technology, an explanatory diagram illustrating an example of the scanning position when a change occurs in the bright line width of the measured object surface.

Through Step S101 to Step S106, in the bright line having the brightness in a linear fashion in the two-dimensional image data 8 acquired from the two-dimensional imaging unit 6, the position corresponding to the luminance value obtained by multiplying the peak value of the luminance by the predetermined luminance reduction coefficient of less than one is set as the scanning position PA. FIG. 6A is an explanatory diagram illustrating an example of the scanning position when a change occurs in the bright line width of the measured object surface, and when the bright line width is of an assumed thickness. FIG. 6B is an explanatory diagram illustrating an example of the scanning position when a change occurs in the bright line width of the measured object surface, and when the bright line width is thinner than the assumed thickness. As illustrated in FIG. 6A and FIG. 6B, even when the width of the bright line is of the assumed thickness (see FIG. 6A), or even when the width of the bright line is thinner than the assumption (see FIG. 6B), the scanning position PA falls within the range of the width of the bright line. In the technology of the foregoing Patent Literature 1, when the width of the bright line is thinner than the assumption, the selection position of pixel may fall outside the width of the bright line (see FIG. 17B), but with the method of the present invention, such a problem does not occur.

The time-series scanning image generator 7b extracts the image data of only a single line in the main-scanning direction corresponding to the scanning position PA held by the scanning-position determination unit 7a from the two-dimensional image data received from the two-dimensional imaging unit 6, and generates a time-series scanning image by arranging and combining the image data in chronological order in the sub-scanning direction (that is, horizontal direction) for the predetermined number of lines (that is, the predetermined number of times of imaging).

The inspection unit 7c processes the generated time-series scanning image and detects a defect image. Although the method of detecting a defect image is not particularly specified, it is desirable that a local luminance change in the time-series scanning image be captured and detected. Various parameters used at this time may be a threshold value set to the luminance value of a defeat image position in the time-series scanning image, may be a signal and image processing filter that processes the time-series scanning image, or may be the shape feature amount of a defect candidate satisfying a threshold value or a threshold value set to the luminance information feature amount included in a defect candidate region. These parameters may be optimized in advance at the time of non-inspection, or may be optimized one after another during the inspection. It is preferable that the optimization be performed in advance. It is further preferable that the amount of data used for the optimization be large. The optimization of parameters in the inspection unit 7c means that the defect location extracted with the parameters becomes the same as the location at which a human checked the defect image thereof and determined it as the defect location. In practice, it is difficult for the extracted defect location to coincide completely with the defect location that the human determines, but such optimization can improve the accuracy of the detection.

EXAMPLE

The following further describes details of the present invention by way of an example. The present invention, however, is not construed to be limited by the example.

In the example, a film conveying roll having hard chrome plating on the surface was inspected. In the inspection, a device having the configuration illustrated in FIG. 2 was used.

As the light irradiation unit 5, white LED illumination of 650,000 lux was used. The light irradiation unit 5 was installed such that its longitudinal direction is parallel to the roll-rotation axis direction and such that its irradiation axis is inclined by 20° with respect to the normal direction of the inspection surface of the roll body 1.

As the area sensor camera 6a constituting the two-dimensional imaging unit 6, an area sensor camera of 4,096 pixels in the main-scanning direction and 3,072 pixels in the sub-scanning direction, and of 8 bit gradation and the frame rate of 180 Hz was used. The two-dimensional imaging unit 6 was installed such that the main-scanning direction of its photoelectric conversion elements is substantially parallel to the longitudinal direction of the light irradiation unit 5 and the roll-rotation axis direction of the roll body 1, and such that its light-receiving center optical axis is inclined by 20° with respect to the normal direction of the inspection surface of the roll body 1. The light-receiving center optical axis of the two-dimensional imaging unit 6 is inclined to the side opposite to the irradiation axis of the light irradiation unit 5 with respect to the normal line of the inspection surface of the roll body 1.

Figure 7:
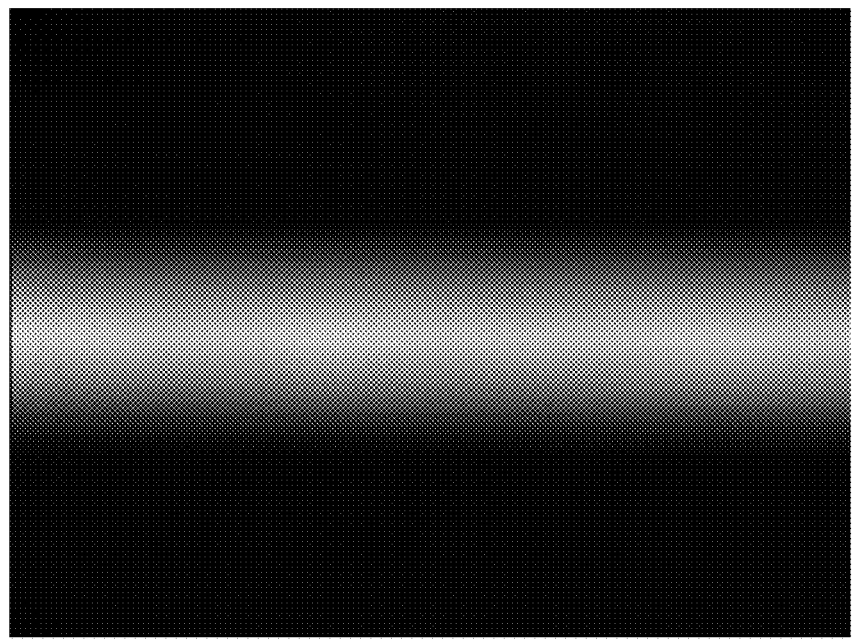
FIG. 7 is an explanatory diagram illustrating an example of a result of imaging a two-dimensional image in the embodiment.
Figure 8:
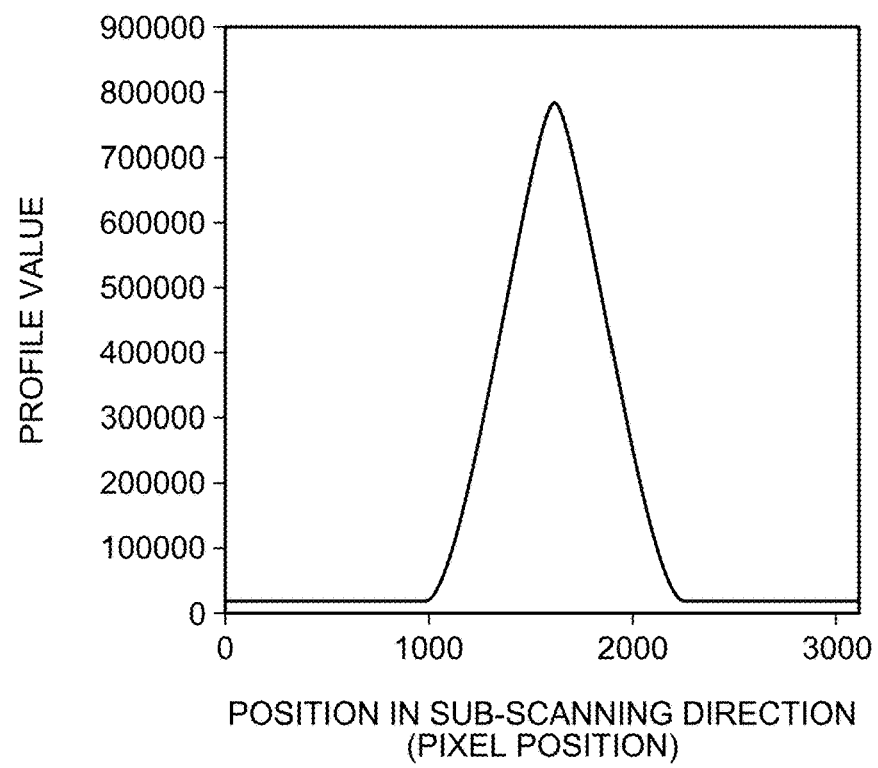
FIG. 8 is an explanatory diagram illustrating an example of a result of acquiring a vertical direction profile from the two-dimensional image in the embodiment.
Figure 9:
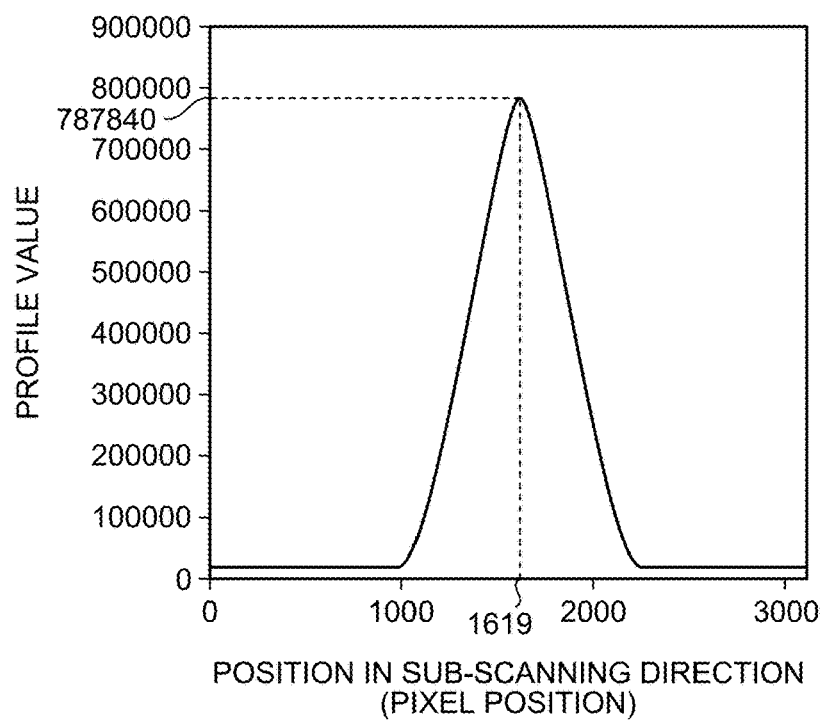
FIG. 9 is an explanatory diagram of a method of calculating a maximum luminance peak position in the embodiment.
Figure 10:
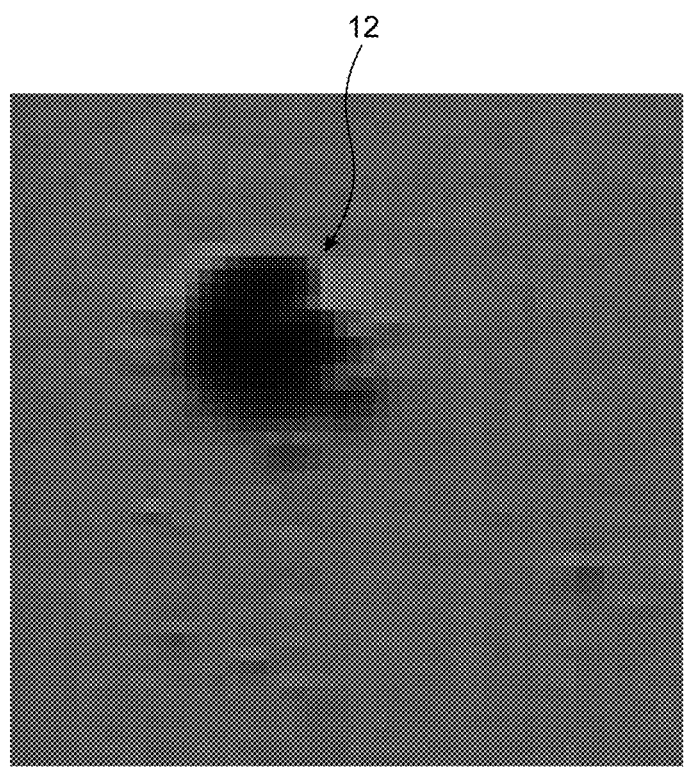
FIG. 10 is an explanatory diagram illustrating an example of a result of generating a time-series scanning image in the embodiment.
Figure 11:
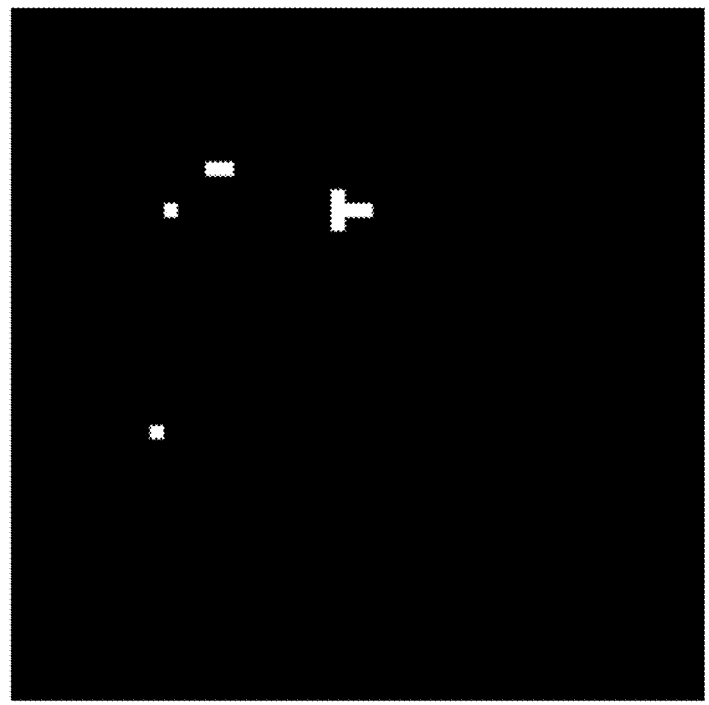
FIG. 11 is an explanatory diagram illustrating an example of a result of a binarization process with a bright threshold value in the embodiment.
Figure 12:
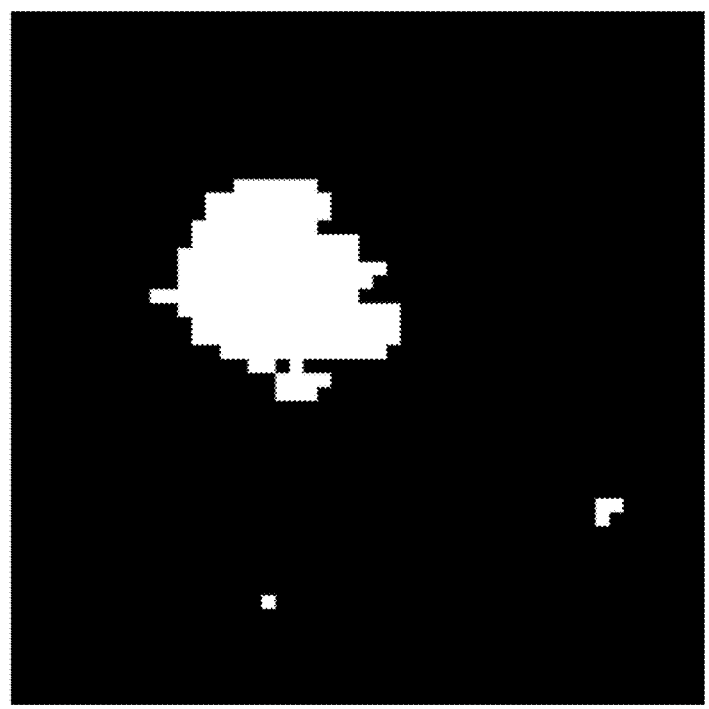
FIG. 12 is an explanatory diagram illustrating an example of a result of the binarization process with a dark threshold value in the embodiment.
Figure 13:
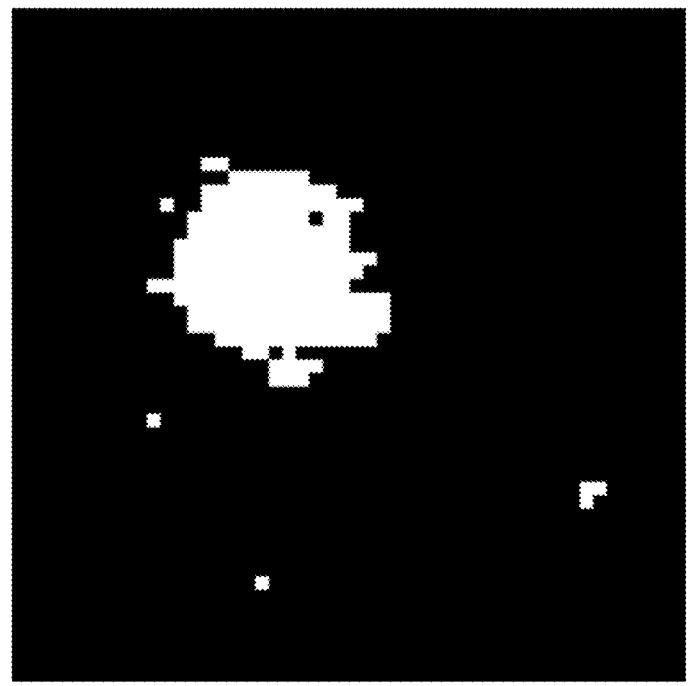
FIG. 13 is an explanatory diagram illustrating an example of a result of OR operation of a binarized image in the embodiment.
Figure 14:
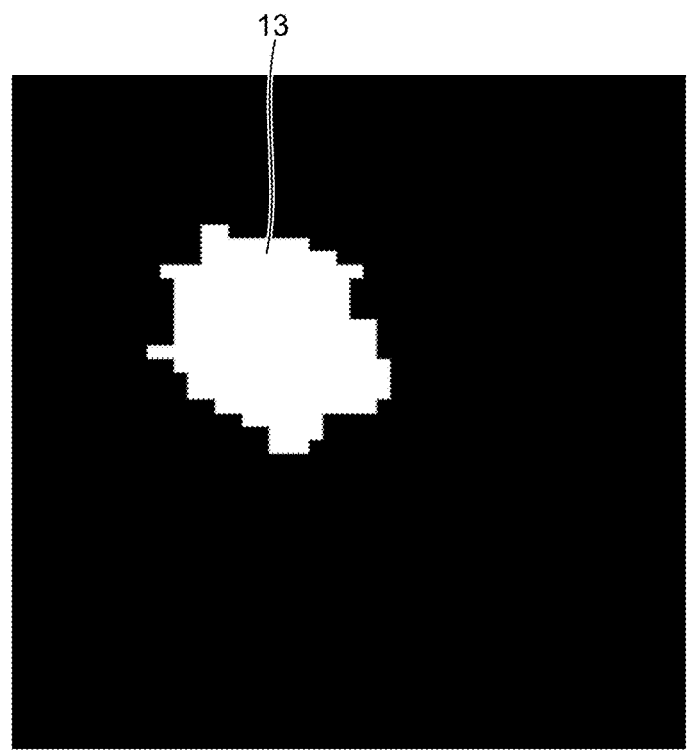
FIG. 14 is an explanatory diagram illustrating an example of a result of a dilation and erosion process in the embodiment.
Figure 15:
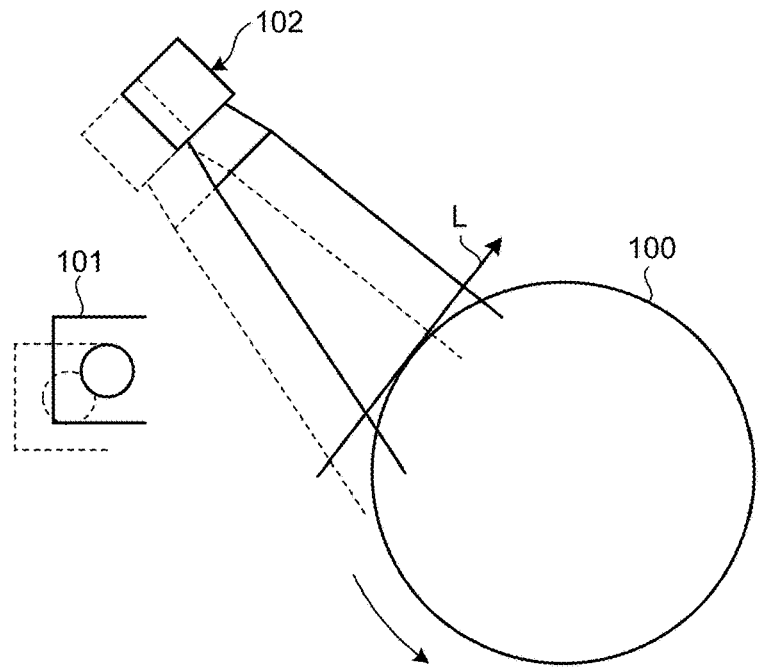
FIG. 15 is, in a conventional technology, an explanatory diagram illustrating a positional relation between a two-dimensional imaging unit and an illumination unit when a relative position between a measured object surface and a light source and an imaging system is displaced in a parallel direction.
Figure 16:
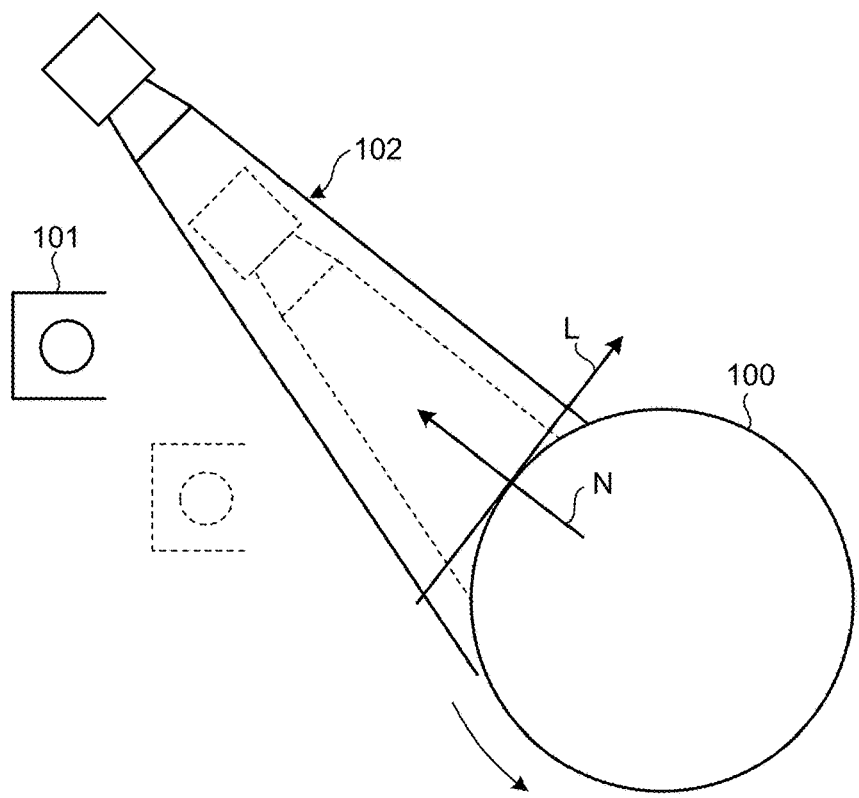
FIG. 16 is, in the conventional technology, an explanatory diagram illustrating the positional relation between the two-dimensional imaging unit and the illumination unit when the relative position between the measured object surface and the light source and the imaging system is displaced in a perpendicular direction.

The image processor 7 was configured by combining a frame grabber board and a personal computer. The image processor 7 generates a time-series scanning image by performing image processing on the two-dimensional image data acquired from the two-dimensional imaging unit 6 and, from the time-series scanning image, detects a defect image. The specific flow of the image processing is as the following (1) to (8).
(1) While rotating the conveying roll at a constant rotational speed, the two-dimensional image illustrated in FIG. 7 was acquired from the two-dimensional imaging unit 6.
(2) By acquiring an integrated value of all the pixels in the main-scanning direction at each pixel position in the sub-scanning direction from the two-dimensional image illustrated in FIG. 7, the profile value of each position in the sub-scanning direction illustrated in FIG. 8 was calculated.
(3) By searching a maximum value of the luminance profile value as illustrated in FIG. 9 from the luminance profile illustrated in FIG. 8, and obtaining the sub-scanning position of the searched luminance maximum value, the maximum luminance peak position was calculated.
(4) The profile value in the maximum luminance peak position was acquired as the maximum luminance value of the profile. In the luminance profile illustrated in FIG. 9, the maximum luminance value was 787,840.
(5) With the value obtained by multiplying the maximum luminance value of the profile by 0.3 as a threshold value (236,352, here), the position that falls below the threshold value in the positive direction in the sub-scanning direction from the maximum luminance peak position was searched and was set as the luminance reduction position.
(6) The luminance reduction position was registered as the scanning position PA.
(7) The image data for one line at the registered scanning position PA was acquired from the two-dimensional image received from the two-dimensional imaging unit 6, and that was performed for each imaging with the imaging of 4,096 times as one cycle. Then, by combining 4,096 pieces of the acquired image data of the scanning position PA in chronological order, the time-series scanning image illustrated in FIG. 10 was generated. In the time-series scanning image illustrated in FIG. 10, in order to facilitate the understanding of the description, only 50×50 pixels that are a part of 4,096×4,096 pixels and are an area including a defect image 12 are cut out and illustrated.
(8) On the acquired time-series scanning image illustrated in FIG. 10, binary processing was performed with a bright-side threshold value that is equivalent to a 20% increase of the luminance value of a normal portion (for example, a portion where no defect is present), and with a dark-side threshold value that is equivalent to a 20% decrease, and two binary images in FIG. 11 and FIG. 12 were acquired. Thereafter, by performing OR operation on the two binary images, the combined image illustrated in FIG. 13 was generated. Furthermore, the detected bright area and the dark area were combined by performing dilation and erosion processing, and by defining as a defect area 13 only an area for which the size exceeds 100 pixels, the image illustrated in FIG. 14 was acquired. In FIG. 11 to FIG. 14, in order to facilitate the understanding of the description, only 50×50 pixels that are a part of the 4,096×4,096 pixels and are the area including the defect image are cut out and illustrated.

As described above, by generating a time-series scanning image from the two-dimensional image data acquired by the two-dimensional imaging unit 6 and performing image processing on the time-series scanning image, a defect image can be detected.

INDUSTRIAL APPLICABILITY

The cylindrical-body surface inspection method and the cylindrical-body surface inspection device according to the present invention are useful for stably and highly accurately inspecting in a cylindrical-body surface defect inspection in which the surface of a cylindrical body is inspected, even if the relative position between the surface of the cylindrical body and the inspection device is changed.

REFERENCE SIGNS LIST

1 ROLL BODY
2 CORE
3 BEARING
4 SURFACE DEFECT
5 LIGHT IRRADIATION UNIT
6 TWO-DIMENSIONAL IMAGING UNIT
6a AREA SENSOR CAMERA
6b LENS
7 IMAGE PROCESSOR

7a SCANNING-POSITION DETERMINATION UNIT
7b TIME-SERIES SCANNING IMAGE GENERATOR
7c INSPECTION UNIT
8 TWO-DIMENSIONAL IMAGE DATA
9 LUMINANCE PROFILE
10 LUMINANCE PEAK POSITION
11 POSITION
71 LUMINANCE-PROFILE CREATION UNIT
72 LUMINANCE-PEAK POSITION CALCULATION UNIT
73 LUMINANCE MEASUREMENT UNIT
74 LUMINANCE-REDUCTION POSITION CALCULATION UNIT
75 SCANNING-POSITION HOLDING UNIT

The invention claimed is:

1. A cylindrical-body surface inspection device for inspecting at an inspection position a surface of a cylindrical body relatively moving in one direction, the cylindrical-body surface inspection device comprising:
  a light irradiation unit configured to irradiate the cylindrical body with light;
  a two-dimensional imaging unit arranged at a position to receive reflected light from the surface of the cylindrical body on which light emitted from the light irradiation unit is reflected;
  a scanning-position determination unit configured to determine at a predetermined period, with respect to two-dimensional image data acquired by the two-dimensional imaging unit, a scanning position that is a scanning position in a first direction of the two-dimensional image data and is corresponding to a circumferential direction of the cylindrical body;
  a time-series scanning image generator configured to
    perform extraction of image data in a second direction perpendicular to the first direction at the scanning position determined by the scanning-position determination unit, out of the two-dimensional image data, on a plurality of pieces of the two-dimensional image data acquired by the two-dimensional imaging unit, and
    generate a time-series scanning image by arranging in chronological order in the first direction each piece of extracted image data of the second direction; and
  an inspection unit configured to inspect the time-series scanning image to detect a defect, wherein
  the scanning-position determination unit includes
    a luminance-profile creation unit configured to
      calculate an integrated value of luminance of each pixel in the second direction at each position in the first direction from the two-dimensional image data acquired by the two-dimensional imaging unit, and
      create a luminance profile in which the integrated value is arranged in the first direction,
    a luminance-peak position calculation unit configured to calculate a peak position of highest luminance from the luminance profile created by the luminance-profile creation unit,
    a luminance measurement unit configured to measure luminance of the peak position of luminance calculated by the luminance-peak position calculation unit,
    a luminance-reduction position calculation unit configured to calculate, from the luminance profile created by the luminance-profile creation unit, a position in the first direction corresponding to luminance obtained by multiplying the luminance of the peak position measured by the luminance measurement unit by a predetermined coefficient multiplication value of less than one, and
    a scanning position holding unit configured to hold a position calculated by the luminance-reduction position calculation unit as the scanning position.

2. The cylindrical-body surface inspection device according to claim 1, wherein
  the light irradiation unit is a linear light source, and
  a direction of a central axis of the cylindrical body, a longitudinal direction of the linear light source, and the second direction of the two-dimensional imaging unit are arranged in parallel to one another.

3. A cylindrical-body surface inspection method for inspecting a surface of a cylindrical body, the cylindrical-body surface inspection method comprising a procedure of:
  irradiating a cylindrical body with light when the cylindrical body is relatively moving in one direction at an inspection position;
  imaging two-dimensionally the light for which the emitted light was reflected on a surface of the cylindrical body;
  determining, only at a predetermined period, a scanning position that is a scanning position in a first direction of two-dimensional image data and is corresponding to a circumferential direction of the cylindrical body;
  generating a time-series scanning image by performing extraction of image data in a second direction perpendicular to the first direction at each determined position in the first direction, out of the two-dimensional image data, on a plurality of pieces of the two-dimensional image data and arranging in chronological order in the first direction each piece of extracted image data of the second direction; and
  inspecting the time-series scanning image to detect a defect, wherein
  the scanning position is set, by obtaining a luminance profile by calculating an integrated value of luminance of each pixel in the second direction at each position in the first direction from the two-dimensional image data and arranging the integrated value in the first direction, to a position in the first direction corresponding to luminance obtained by multiplying luminance of a peak position of highest luminance from the luminance profile by a predetermined coefficient multiplication value of less than one.

4. The cylindrical-body surface inspection method according to claim 3, further comprising:
  irradiating a surface of the cylindrical body with linear light; and
  arranging a direction of a central axis of the cylindrical body, a longitudinal direction of the linear light, and a main-scanning direction in the two-dimensional imaging in parallel to one another.

* * * * *